July 5, 1960
C. H. WATKINS
2,943,996
REFORMING PROCESS
Filed June 10, 1957
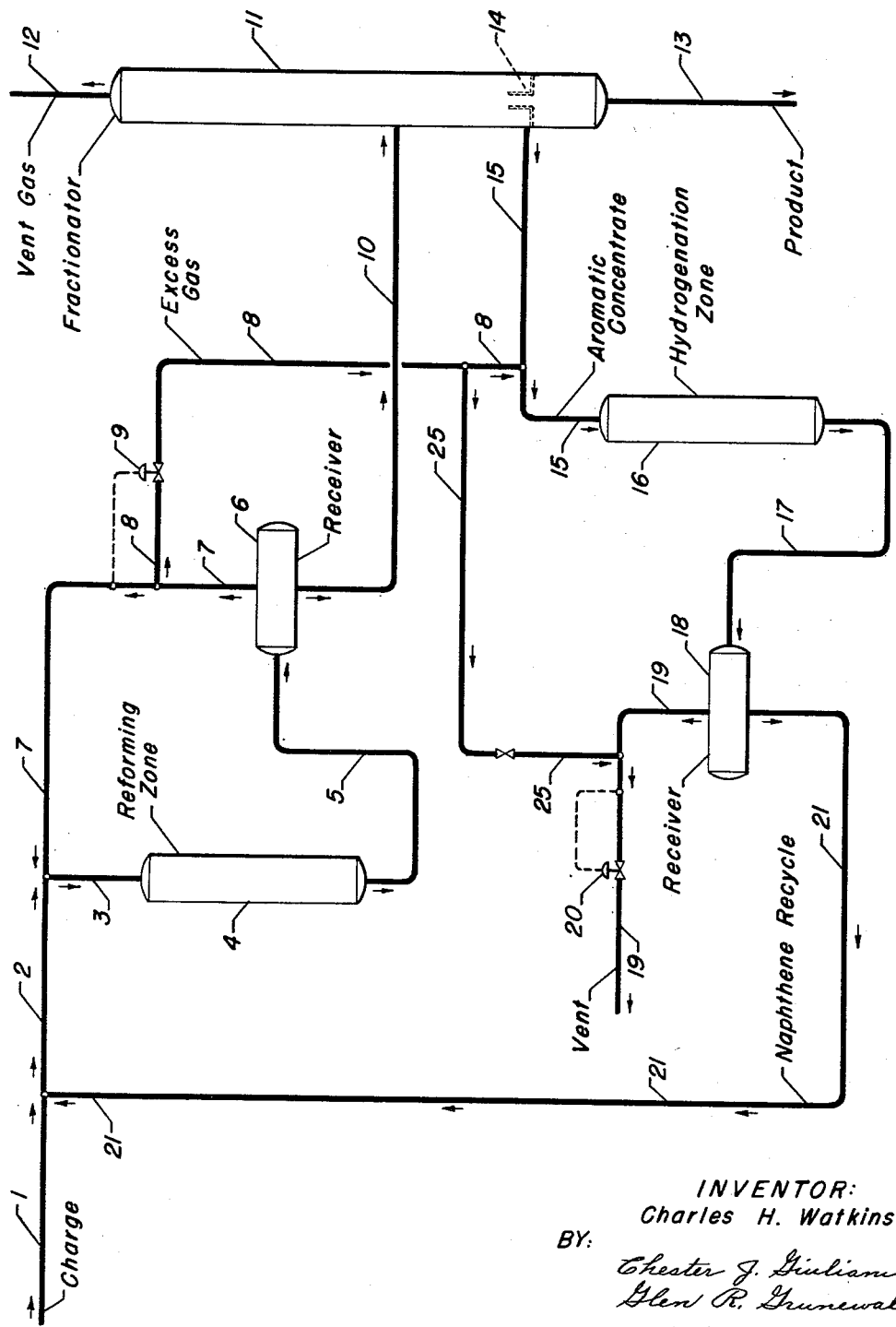
INVENTOR:
Charles H. Watkins
BY:
Chester J. Giuliani
Glen R. Grunewald
ATTORNEYS

2,943,996
REFORMING PROCESS

Charles H. Watkins, Arlington Heights, Ill., assignor, by mesne assignments, to Universal Oil Products Company, Des Plaines, Ill., a corporation of Delaware Filed June 10, 1957, Ser. No. 664,822

1 Claim. (Cl. 208—62)

This invention relates to a process for reforming hydrocarbons and particularly to a combination of a reforming process and a hydrogenation process which interact with each other to produce a high concentration of hydrogen in the circulating gas stream of the reforming process.

Reforming hydrocarbon fractions, particularly gasoline fractions, has become a widely used commercial process. The reforming process is characterized by producing stable, clean, high octane rating gasolines from straight-run or olefinic and sulfur-containing low octane rating gasolines. The process is performed by passing the gasoline to be reformed into a reaction zone maintained at temperatures of from about 800° F. to about 1000° F. and a pressure of from about 200 p.s.i. to about 1000 p.s.i. and in the presence of a catalytic substance and hydrogen gas. The reactions effected in reforming comprise primarily dehydrogenation of naphthenes to produce aromatics, isomerization of straight-chain hydrocarbons to produce branched chain hydrocarbons, cyclization of straight-chain hydrocarbons to produce naphthenes, hydrodesulfurization of sulfur-containing compounds to produce hydrogen sulfide and the corresponding hydrocarbon and hydrocracking of large aliphatic molecules to produce shorter-chained aliphatic molecules. Other reactions take place to a lesser degree such as the production of hydrocarbons from oxygen-, nitrogen- or halogen-containing molecules and the production of normally gaseous hydrocarbons by cracking.

The catalyst employed is usually a catalyst which has both hydrogenating and cracking activity and usually consists of a heavy metal having hydrogenating activity such as the group V, VI, VII and VIII metals and preferably platinum disposed on a porous refractory inorganic oxide base such as alumina, silica-alumina, magnesia, zirconia but preferably alumina containing a small quantity of combined halogen, particularly fluorine or chlorine. In order for the catalyst to remain active, its active surfaces and metallic surfaces must not be covered with carbonaceous deposits and it is accordingly necessary to maintain a high partial pressure of hydrogen within the reaction zone so that saturation of unstable materials is effected before they can condense into the heavy carbonaceous materials known as coke which deposit on the catalyst.

When higher octane rating gasoline is required, the reforming processes must be operated at more severe conditions which usually consist of either higher temperatures or longer residence time within the reaction zone. The severe conditions usually also require higher pressures since the hydrogenating activity within the reaction zone must be more pronounced to prevent the adverse effects hereinbefore described. At severe conditions the hydrogen partial pressure is diminished since the increased cracking activity produces greater quantities of normally gaseous hydrocarbons, for example, methane, ethane, propane and to some extent, butane. These gases enter the circulating gas stream and dilute the hydrogen so that greater total pressures are required in order to maintain the same hydrogen partial pressure. Presently, the hydrogen purity in a process maintains itself at an equilibrium level. A reforming process will always result in a net hydrogen yield so that some gases must be constantly vented from the system in or der to maintain the pressure at the desired level, however, the gases that are vented are identical in composition with the gas being circulated so that no enrichment in hydrogen is effected by the venting but the equilibrium composition of the gas remains constant. The vent gas, therefore, contains anywhere from 65 to 90% by volume of valuable hydrogen which is wasted along with the much smaller percent of normally gaseous hydrocarbons. It is an object of this invention to provide a process for enriching the circulating hydrogen stream of a reforming process in hydrogen or conversely, to provide a process that enriches the vent gas stream in undesirable constituents such as hydrogen sulfide and normally gaseous hydrocarbons.

It is an embodiment of this invention to provide a process for reforming a hydrocarbon fraction containing naphthenic hydrocarbons which comprises introducing a stream of said fraction into a reforming zone containing a reforming catalyst and maintained at reforming conditions in the presence of hydrogen, passing the effluent from said reforming zone into a first receiver wherein a liquid separates from a vapor, passing said liquid into a separation zone wherein it is separated into a product stream and an aromatic hydrocarbon-rich stream, passing the latter into a hydrogenation zone which contains hydrogenating catalyst at hydrogenating conditions, passing vapor from said first receiver into said hydrogenating zone, passing the resultant naphthenic hydrocarbon-rich effluent from said hydrogenating zone to a second receiver wherein it is separated into a naphthene-rich liquid and a vapor, venting the vapor and combining said naphthene-rich liquid with said hydrocarbon fraction.

Briefly, the process of this invention provides a combination of a hydrogenation and a reforming process wherein a portion of the reformed product is hydrogenated and returned to the reforming reaction zone as a hydrogen donor. The hydrogen with which the reformed fraction is hydrogenated is the vent gas from the reforming zone so that the hydrogen contained therein is extracted from the vent gas by being chemically combined with an aromatic reformate fraction and is introduced into the reforming reaction zone as a readily-dehydrogenated naphthenic stream. The gas from the hydrogenating zone from which hydrogen has been extracted is enriched in the undesirable components of the recirculating hydrogen stream and is vented as the ultimate waste gas from the combined process.

The process of this invention may be better described in relation to the accompanying drawing which illustrates schematically one specific example of the operation of this invention and is intended to be illustrative rather than limiting upon the broad scope of this invention.

The feed stream is charged to the process in hot condition through line 1 and combines with a highly naphthenic material entering through line 21, the source of which will be hereinafter described, and passes into line 2. The charge material, as heretofore stated, is straight-run gasoline having an octane rating of about 40, however, the reforming process may be effected on charges consisting of cracked gasoline, natural gasoline, naphtha, light gas oil, etc. or mixtures of these. When the charge in line 2 is not sufficiently hot a heater may be employed at this point, however, ultimately, the charge in line 2 combines with a circulating hydrogen stream containing about 87% hydrogen from line 7 and the mixture passes through line 3 into reforming zone 4.

In reforming zone 4 the charge contacts a catalyst such as those heretofore described and preferably a catalyst consisting of alumina combined with about 0.8% by weight of fluorine, and having deposited thereon about 0.35 weight percent platinum. At conditions wherein the reactor inlet temperature is maintained at about 950° F. and the total pressure in the plant is at about 700 p.s.i., the charge stock of straight-run gasoline is converted to a reformed product having an octane rating of about 95 F–1 clear and other characteristics of purity and the effluent from the reforming zone passes through line 5 into receiver 6 which is maintained at about 100° F., wherein it separates into a gas phase and a liquid phase.

The liquid phase passes from the bottom of receiver 6 through line 10 and into the middle of fractionation column 11 wherein it is separated into the desired fractions. Ordinarily, when gasoline is being reformed, fractionator 11 is known as a stabilizer and is operated so that overhead line 12 removes most of the normally gaseous hydrocarbons and at least a portion of the butane from the gasoline fraction while the remainder of the charge to fractionator 11 passes downwardly as liquid product. An intermediate tray 14, however, is employed in this embodiment within fractionator 11 at a point where a high concentration of mononuclear aromatics is maintained within fractionator 11. The portion of these aromatics that are not contained on tray 14 pass downwardly through the column and are removed through line 13 as liquid product along with the other components of the gasoline fraction. The highly aromatic fraction on tray 14 is passed through line 15 into hydrogenation zone 16.

The gaseous portion of the reforming reactor effluent passes from the top of receiver 6 through line 7 and is returned to reforming reaction zone via line 7 and the hereinbefore described line 3. Since excess gas is produced by the process, it is necessary, in order to maintain the desired reactor pressure, to remove some of the circulating gas stream and this is accomplished through control valve 9 and line 8. The excess gas from the process passing through line 8, however, combines with the aromatic liquid stream in line 15 and is employed as a hydrogen source for the saturation of those aromatics in hydrogenation zone 16. Since the highly aromatic charge to hydrogenation zone 16 is stable, sulfur-free and low boiling, it may readily be hydrogenated and the catalyst activity may be maintained high for long periods of time when employing so ideal a charge. The catalyst employed in hydrogenation zone 16 may be the same as the catalyst employed in reforming zone 4 or it may be a catalyst such as 30% by weight of nickel disposed on silica, cobalt disposed on silia or alumina or any other catalyst having high hydrogenation activity. When the original charge to the process contains sulfur and when the recycle gas stream contains hydrogen sulfide, it is preferred that the catalyst in hydrogenation zone 16 contain a sulfur-resistant catalyst such as platinum or a mixture of 3% cobalt and 6% molybdenum disposed on alumina.

Hydrogenation zone 16 may be operated at whatever presure the excess recycle gas stream is at and at a temperature of from about 100° F. to about 450° F. The hydrogenation is very readily effected at these conditions and high partial pressures of hydrogen in the gas stream are not necessary in order for a substantially complete saturation to be effected. The inlet temperature to hydrogenation zone 16 preferably is low enough so that the outlet temperature, which will be higher due to the exothermicity of hydrogenation reactions, will be low enough so that the equilibrium towards hydrogenation of aromatics is favored. The inlet temperature to reactor 16 is preferably about 200° F.

The effluent from hydrogenation reaction zone 16 passes through line 17 and into receiver 18 wherein a liquid containing substantial quantities of mononuclear naphthenes separates from a gas which is greatly enriched in normally gaseous hydrocarbons and other vapor phase impurities from the excess recycle gas stream. This material passing through line 19 and valve 20 is vented or burned or otherwise removed from the process while the naphthenic recycle passes from receiver 18 through the hereinbefore described line 21 to combine with the charge in line 1.

The hydrogen purity in the circulating stream, for example the gas passing through line 7, may be maintained at any desired level by regulating the flow of material through line 15. When, for example, it is desired to increase the purity of hydrogen in the reforming zone, the flow of aromatic-rich hydrocarbon may be increased to the hydrogenation zone 16 and as a consequence, more hydrogen will be extracted from the gas passing through line 8. As a result of this, more naphthenes will enter the charge through line 21 and more hydrogen will be produced in the reaction zone which in turn will increase the flow rate through line 8 and valve 9 which causes greater quantities of impurities to be removed from the process.

Many modifications of this invention may be made to adapt it to specific circumstances or conditions. For example, when it is desired to pass a pure or specific aromatic stream to reactor 16, a more efficient or elaborate separation system may be used. When a light aromatic stream is desired and recycling is to be minimized, the material in line 15 may be solvent extracted to separate its aromatic constituents from its aliphatic constituents and the aromatics only may be passed to hydrogenation zone 16. When it is desired to pass heavier aromatics to zone 16, the product stream may be fractionated so that all except the highest boiling portion is taken as product and the highest boiling portion, for example, the highest boiling 10% by volume, will be greatly enriched in aromatics and, therefore, useful for extracting hydrogen from the vent gas stream.

From the foregoing description, it can be seen that the combination process of this invention provides a means for extracting hydrogen from vent gas and returning it in purified form to the reforming zone. The hydrogenation zone 16 may be substantially smaller than reforming zone 4 and may take a small fraction, for example 5% of the total product, and subject it to hydrogenation and return to the reforming zone and still perform its function of extracting most of the hydrogen out of the excess recycle gas stream. When the purity of the recycle gas stream is high and it is not desired to recycle so much liquid product, a by-pass 25 may be provided as shown so that any desired proportion of the excess recycle gas may be vented directly without passing through hydrogenation zone 16.

I claim as my invention:

A process which comprises reforming a naphthene-containing hydrocarbon charge in the presence of hydrogen, separating the resultant products into a hydrogen-containing gas phase and a reformed gasoline liquid phase, fractionating the latter to separate therefrom a gasoline product and a lighter aromatic concentrate boiling in the gasoline range, catalytically hydrogenating said concentrate with at least a portion of said hydrogen containing gas phase at a temperature of from about 100° to about 450° F. to form naphthenes, separating resultant naphthene-rich liquid from unreacted gases, venting said gases from the process and supplying said naphthene-rich liquid to the aforesaid reforming step as a hydrogen donor therein.

(References on following page)

References Cited in the file of this patent

UNITED STATES PATENTS

| | | |
|---|---|---|
| 2,335,596 | Marschner | Nov. 30, 1943 |
| 2,696,460 | Hemminger | Dec. 7, 1954 |
| 2,697,684 | Hemminger | Dec. 21, 1954 |
| 2,703,308 | Oblad et al. | Mar. 1, 1955 |
| 2,742,518 | Mattox | Apr. 17, 1956 |
| 2,772,215 | Hemminger | Nov. 27, 1956 |
| 2,772,218 | Martin | Nov. 27, 1956 |
| 2,791,541 | Thomas et al. | May 7, 1957 |
| 2,889,264 | Spurlock | June 2, 1959 |